J. NEZNALSKI & J. MASLANIK.
MOTOR VEHICLE.
APPLICATION FILED DEC. 9, 1914.

1,157,174.

Patented Oct. 19, 1915
2 SHEETS—SHEET 1.

WITNESSES
A. Kempler.
Max H. Srolony.

INVENTORS
J. Neznalski.
J. Maslanik.
Henry G. Ewert
ATTORNEY

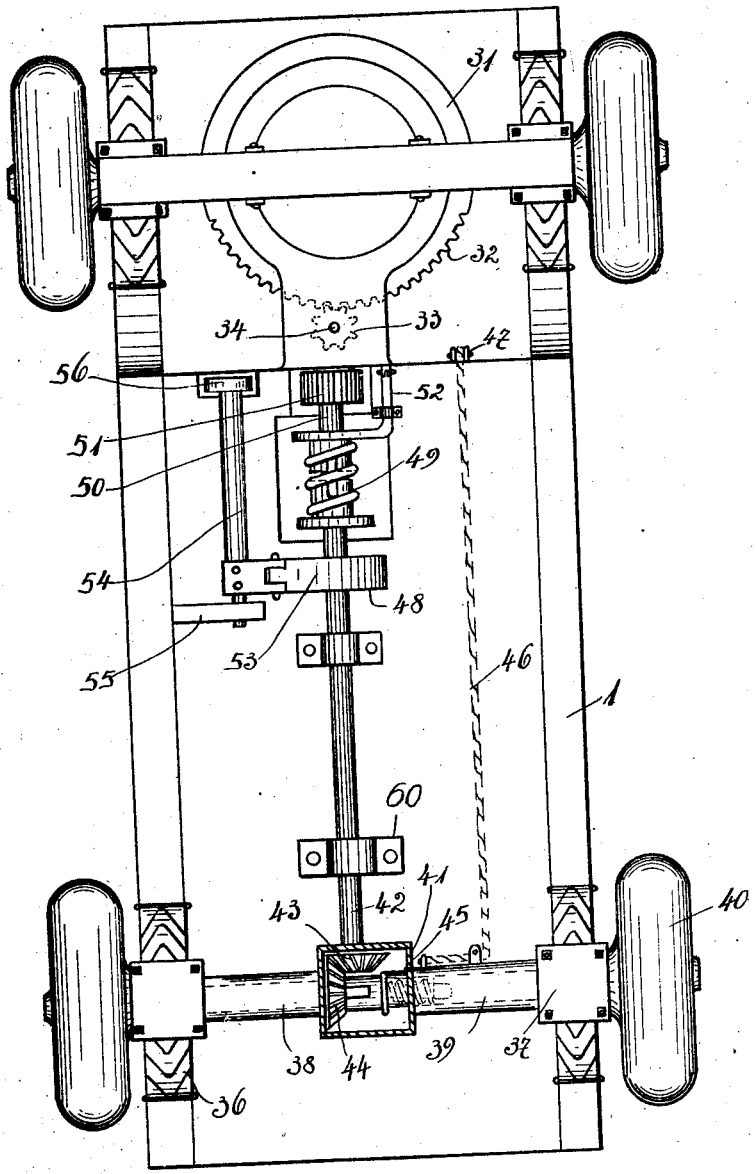

UNITED STATES PATENT OFFICE.

JOSEF NEZNALSKI AND JOSEF MASLANIK, OF McKEES ROCKS, PENNSYLVANIA.

MOTOR-VEHICLE.

1,157,174.  Specification of Letters Patent.  Patented Oct. 19, 1915.

Application filed December 9, 1914. Serial No. 876,294.

*To all whom it may concern:*

Be it known that we, JOSEF NEZNALSKI and JOSEF MASLANIK, subjects of the Emperor of Austria-Hungary, residing at McKees Rocks, in the county of Allegheny and State of Pennsylvania, have invented certain new and useful Improvements in Motor-Vehicles, of which the following is a specification, reference being had therein to the accompanying drawing.

This invention relates to motor vehicles and has for its object to provide a vehicle of such class, in a manner as hereinafter set forth, with independent driving means for the front and rear axles.

A further object of the invention is to provide a motor vehicle, in a manner as hereinafter set forth, with independent driving means for the front and rear axles, each of said driving means having associated therewith a clutching device for operatively connecting it with that axle with which it associates.

Further objects of the invention are to provide a motor vehicle which is comparatively simple in its construction and arrangement, strong, durable, efficient in its use, readily set up and comparatively inexpensive.

With the foregoing and other objects in view the invention consists of the novel construction, combination and arrangement of parts as hereinafter more specifically described and illustrated in the accompanying drawings wherein is shown an embodiment of the invention but it is to be understood that changes, variations and modifications can be resorted to which come within the scope of the claim hereunto appended.

Figure 1:
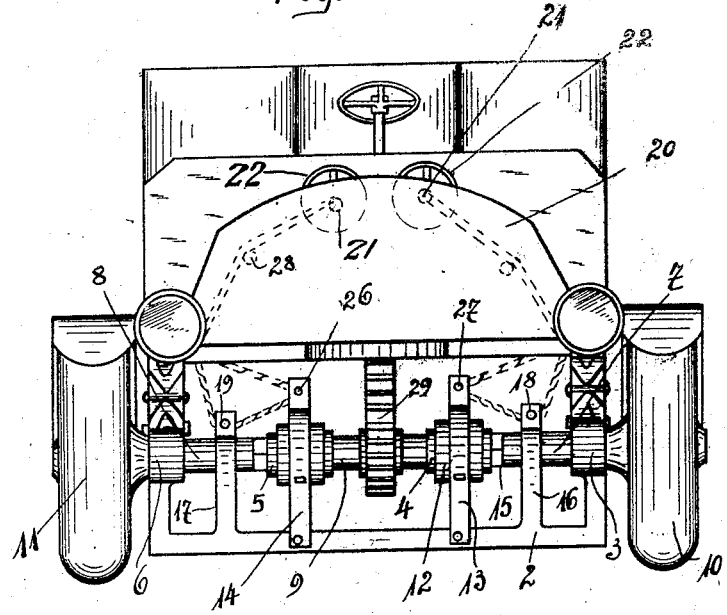
Figure 2:
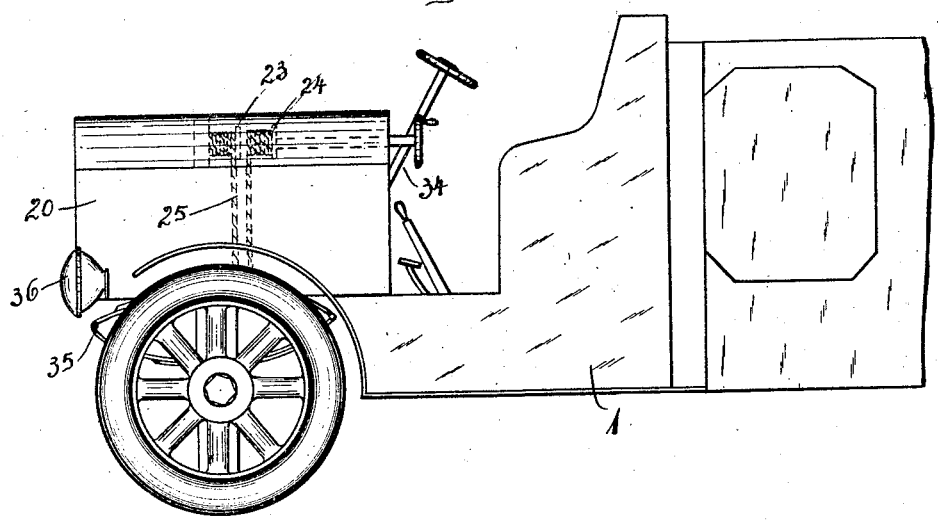

In the drawings wherein like reference characters denote corresponding parts throughout the several views, Figure 1 is a front elevation of a motor vehicle in accordance with this invention. Fig. 2 is a side elevation, and Fig. 3 is an inverted plan.

Referring to the drawings in detail 1 denotes the vehicle-body, which has suspended from the forward end thereof a frame 2, having bearings 3, 4, 5, and 6 for the front axle and the latter consists of a pair of outer sections 7, 8, and an intermediate section 9. The outer section 7 is mounted in the bearing 3 and is provided with a front wheel 10 and the outer section 8 is mounted in the bearing 6 and carries a front wheel 11ª. The intermediate section 9 is mounted in the bearings 4, 5, which are carried by collars 12, connected to pivoted supports 13, 14, forming a part of the frame 2. The ends of the sections 7 and 8 are squared as at 15 and are adapted to be detachably connected with the bearings 4, 5 respectively, whereby when the intermediate section 9 is driven, the outer sections 7 and 8 of the axle will be carried therewith. The frame 2 further includes a pair of fixed supports 16, 17, the former has a roller 18 and the latter a roller 19.

Mounted in the hood 20 of the vehicle body, is a pair of longitudinal extending shafts 21, each having a hand wheel 22, and each further provided with a pair of drums 23, 24, upon which alternately wind and unwind the ends of a flexible shifting member 25. One of the members 25 travels over the roller 19 and is connected to a pin 26 carried by the pivoted support 14 and the other member 25 is connected to a pin 27, carried by the pivoted support 13. The flexible members 25 also travel over idlers 28 carried by the hood.

The flexible members 25 are employed for shifting the pivoted supports 13, 14, for the purpose of coupling the sections 7, 8, to the bearings 4, 5, whereby said sections 7, 8, of the axle will be driven from the intermediate section 9 of the axle and said members 25 are further employed for the purpose of uncoupling the sections 7, 8, of the axle, from the intermediate section 9.

The intermediate section 9 has a gear wheel 29, which is driven from a motor mounted in the hood 20.

The frame 2 is pivotally connected to the vehicle body 1, in any suitable manner, and attached to the body is a disk 31 having a portion of its edge, toothed as at 32, and meshing with the teeth of the disk 31 is a pinion 33, carried by the steering post 34. The latter, in connection with the pinion 33 and toothed disk 31 constitutes steering mechanism for the front axle.

Connected with the frame 2, as well as with the vehicle body, in any suitable manner, are the forward springs 35 of the vehicle. The hood 20 supports a pair of lamps 36.

Attached to the lower face of the vehicle body 1, at the rear thereof, are the rear springs 36 of the vehicle, and connected to the lower sections of the springs 36, are bearings 37, for the sections 38, 39 of the rear axle. Each of the sections of the rear axle is provided with a wheel 40.

Secured to the bottom of the body portion 1, at the rear thereof, is a casing 41, into which extends a transmission shaft 42, having a pinion 43 secured to the end thereof, and also extending into said casing 41, is a section 38 of the rear axle, the latter having a beveled gear 44 meshing with the pinion 43. The section 39 carries a clutching mechanism 45 which associates with the section 38, whereby the section 39 can be operatively connected to the section 38, and under such construction of the sections of the rear axle are driven through the medium of a connection between the section 38 and transmission shaft 42.

The clutching mechanism 45 is operated through the medium of a flexible member 46, attached to a shifting lever 47, the latter being within the reach of the operator.

The transmission shaft 42 is mounted in bearing brackets 60, which are secured to the bottom of the body portion 1, and said transmission shaft 42 carries a fly wheel 48, and furthermore has associated therewith a clutching mechanism 49, which is associated with a drive shaft 50, having a pinion 51, and which is operatively connected with a motor, carried by the body portion 1 and such motor is independent from the motor for driving the axle. The operating means for the clutch mechanism 49 is shown as at 52.

Associated with the fly wheel 48, is a band brake 53, connected with a rock shaft 54, supported in the bearings 55, and having attached thereto a shifting lever 56, which is in convenient reach of the operator.

What we claim is:—

In a motor vehicle of the class described, a body, a frame suspended from the forward portion thereof and provided with bearings at its ends, axle sections rotatably mounted in said bearings, wheels carried on the outer ends of said axle sections, an intermediate driving section arranged in longitudinal alinement between the aforesaid axle sections, a pair of substantially vertical supporting arms pivoted at their lower ends to the frame, bearing members carried by said supporting arms and rotatably receiving the intermediate axle therein to support the latter in position, the outer ends of said last mentioned bearings being adapted for engagement respectively with the inner ends of the first mentioned axle sections, whereby to connect the latter to the intermediate axle section, means for oscillating said pivotal supporting arms, whereby to connect and disconnect the intermediate and first mentioned axle sections and means for driving said intermediate axle section.

In testimony whereof we affix our signatures in the presence of two witnesses.

JOSEF NEZNALSKI.
JOSEF MASLANIK.

Witnesses:
 MAX H. SROLOVITZ,
 MARIE H. ZBIECA.